May 17, 1960 W. R. MERCER 2,936,996
PISTON OPERATED VALVE
Filed Dec. 10, 1956
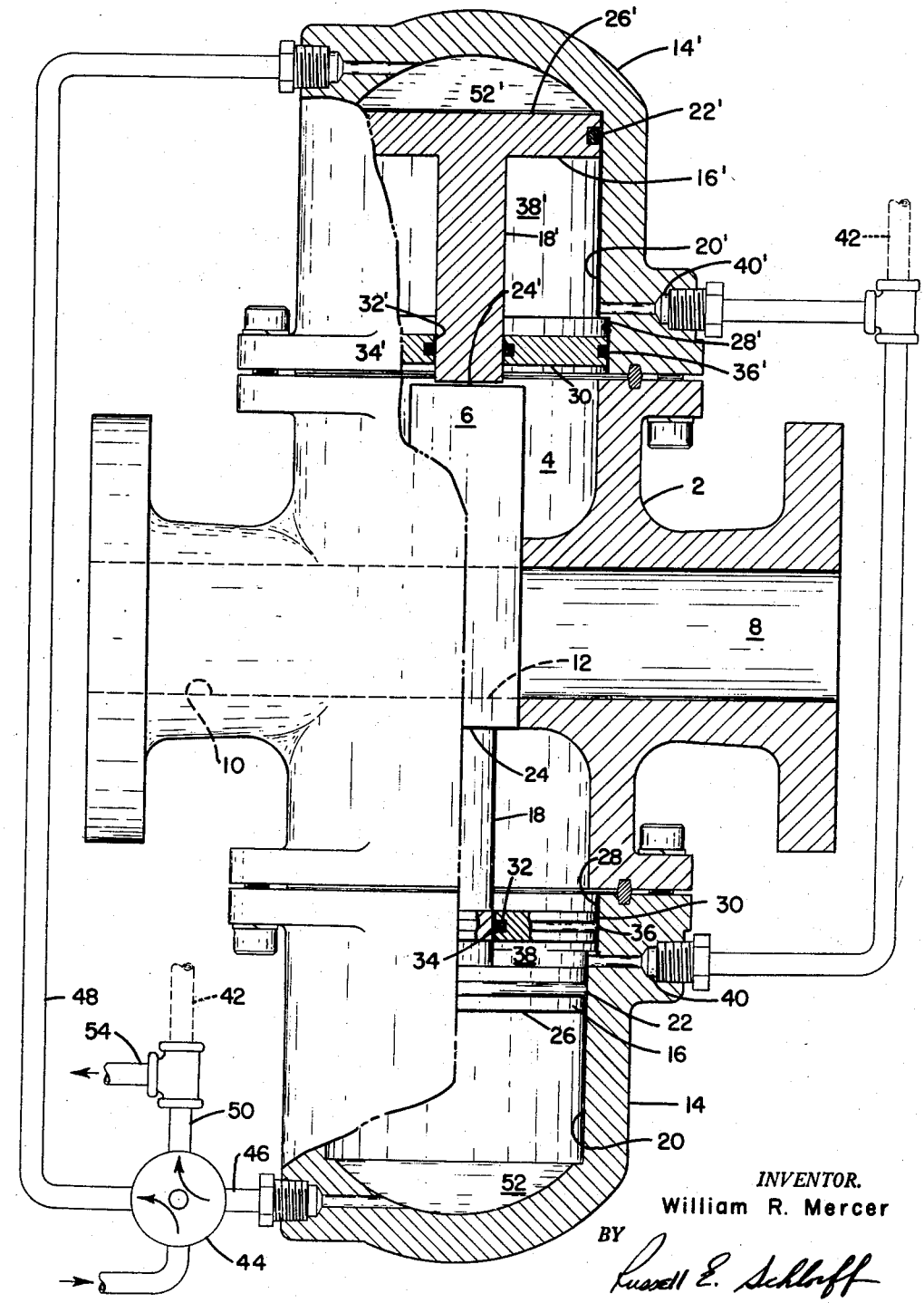
INVENTOR.
William R. Mercer
BY
*Russell E. Schloff*
ATTORNEY United States Patent Office 2,936,996
Patented May 17, 1960

2,936,996

PISTON OPERATED VALVE

William R. Mercer, Houston, Tex., assignor to ACF Industries, Incorporated, New York, N.Y., a corporation of New Jersey Application December 10, 1956, Serial No. 627,155

3 Claims. (Cl. 251—31)

This invention relates to a piston operated valve and more particularly to a primary seal therefor.

In piston operated valves it is quite customary to provide a packing seal between the valve body and the valve operating system; however, as a rule such packing is stationary and when there is a substantial pressure differential between the pressure in the body and the pressure in the system, such as when one side of the system is being exhausted, to provide fluid and pressure for the other side, or when the valve is in closed position and there is increase in temperature expanding the body fluid, there is a tendency for body fluid to leak into the operating system. Valve operating systems are engineered to operate on clean fluid and leakage of line fluid into the valve operating system is undesirous inasmuch as the line fluid may be corrosive or contain abrasive particles.

In order to eliminate the possibility of contamination of the operating system by line fluid, the present invention utilizes a floating seal interposed between the valve housing and the valve operating system. The utilization of the floating seal permits the same pressure to exist in the valve body and a chamber in the operating system and, therefore, by eliminating the pressure differential, the tendency of line fluid to leak past the seal is greatly minimized, preventing the likelihood of contaminating the valve operating system with deleterious matter contained in the line fluid.

It is an object of the present invention to provide a sealing means for a piston operated valve which will greatly reduce the possibility of leakage of line fluid into the valve operating system.

It is another object of the present invention to provide a floating seal between the valve operating system and valve body.

It is a further object of the present invention to provide a piston operated valve in which the contamination of operating fluid is reduced to a minimum.

It is a further object of the present invention to provide a piston operated valve equipped with means to compensate for variations in atmospheric temperature.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

The figure is an elevational view, partly in section of a gate valve embodying the present invention.

The valve has a housing 2 provided with an interior chamber 4 which houses the gate mechanism 6 of the valve. Aligned passages 8 and 10, formed in opposite walls of the housing, form communicating passages adapted to be brought into and out of registry by a reciprocating gate 6, which is provided with a conduit 12 aligning the passages 8 and 10 in valve open position. The remainder of the gate 6 is solid and flow of fluid is prohibited in valve closed position. While a slab gate is shown, other well known types of gate means may be used.

Attached to each end of the housing 2 are closure caps 14, 14' which also serve as cylinders for the pistons that constitute the fluid pressure operating means for the valve. The fluid motors are arranged one at each end of the valve housing and are in axial alignment. Since they are alike in construction and operation, it is believed that a description of one will suffice.

Each fluid motor consists of a piston 16 having a stem 18. The piston 16 is adapted to move within the cylinder 20 formed in the closure cap 14. The circumferential edge of the piston 16 may be provided with a circumferential groove to receive an O-ring 22. The end 24 of the stem 18 is adapted to engage and move the gate 6 when fluid pressure is applied to the outer side 26 of the piston 16. The stem 18 is not connected to the gate 6 and, therefore, it will not unintentionally move the gate from its desired position. The only way that the gate 6 can be moved is to apply pressure to the outer side 26 of the piston 16.

The inner cylindrical wall of each closure cap 14 adjacent the housing is of a slightly greater diameter than the cylinder 20 and forms a cylinder 28 concentric with the cylinder 20 for the reception of a floating seal 30. The floating seal 30 is in the form of a free floating piston having a center hole 32 adapted to permit stem 18 to slide through. The circumferential wall of the center hole 32 and circumferential wall of the piston are provided with recesses to receive O-rings 34 and 36. Other types of packing may be used in place of the O-rings. The chamber 38 formed between the piston 16 and the floating seal 30 is provided with an outlet 40 which is manifolded with the outlet from the other chamber 38' and flows into the common manifold 42 which forms part of the closed fluid pressure operating system. Since the parts of both fluid motors are the same, they have been designated by the same reference characters; however, in order to prevent confusion in the remainder of the specification, the reference characters for the upper motor shown in the drawing have been provided with primes, such as 16'.

The closed fluid pressure operating system is comprised of a motor and pump (not shown) to supply fluid under pressure, a four way valve 44, conduits 46—48, which run to the ends of the valve, manifold 42, which joins with an exhaust conduit 50—54 from the four way valve to the suction side of the pump and incompressible operating fluid. In order to open the valve, the position shown in the drawing, operating fluid under pressure is supplied to chamber 52 and the operating fluid in chamber 52' is exhausted. As the piston 16 moves toward piston 30, it will force the fluid in chamber 38 out the opening 40 through the manifold 42 into chamber 38'. Any excess operating fluid from chambers 38—38', which would be operating fluid that had leaked past seals 22—22', will flow back to the suction side of the pump through manifold 42 and conduit 54. During the operation, there will be no substantial pressure drop between the interior of the valve and either chamber 38—38', as would normally be the case when the chamber containing operating fluid is directly connected to the valve body.

Therefore, since the pressure in the interior 4 of the valve and in the areas 38—38' are substantially equalized by the floating action of pistons 30—30', leakage of line fluid from the interior 4 of the valve into the closed operating system is greatly reduced. As pressure in the interior of the valve increases, the piston 30 is free to move and, therefore, transmits substantially the same pressure existing in interior 4 of the valve to the fluid existing in chambers 38—38'. This action places the chambers 38—38' and the interior 4 of the valve in a state of equilibrium. Since the pressure in the chambers 38—38' and the interior 4 of the valve are substantially equal, there is very little tendency for leakage past the pistons 30—30'. Instead of having a pressure drop between areas containing line fluid and areas containing operating fluid, the pressure drop will be between areas both containing operating fluid; therefore, if there is leakage, there will be no contamination.

To close the valve, the four way valve 44 is positioned to exhaust fluid from chamber 52. The exhausted fluid is circulated through the pump and supplied under pressure to chamber 52'. As the piston 16' moves toward the floating piston 30', the fluid in the chamber 38' flows out passage 40' through manifold 42 to chamber 38; if there is any excess fluid, it flows to the suction side of the pump through conduit 54. As previously mentioned, normally while operating fluid is being exhausted from one end of the valve, there is a substantial pressure differential between fluid in the body and the operating fluid and, therefore, a tendency for leakage occurs. In the valve of the present invention, the floating pistons act as a buffer zone maintaining chambers 38—38' in substantial equilibrium with the interior 4 of the valve.

With the valve in the closed position, there is some fluid in the interior 4 of the body which is entrapped as the valve closes. If the temperature of the atmosphere increases, the entrapped fluid will expand and again a condition that may cause a pressure differential between the fluid in the body and the fluid in the operating system often arises; however, in the valve of the present invention, as the fluid in the body expands, it will cause the floating pistons 30—30' to move outwardly of the valve thereby bringing the pressure in the chambers 38—38' into equilibrium with the pressure in the body. Therefore, there will be no pressure differential and no likelihood of line fluid flowing past the seals of the floating pistons and contaminating the operating fluid.

I claim:

1. A piston operated valve comprising, a hollow cruciform valve body having communicating flow passages therethrough, a reciprocating gate interposed between said passages adapted to bring said passages into and out of registry, the ends of the body being closed by hollow caps, the interior of said caps being formed into cylinders, an operating piston having a stem adapted to contact the gate located in each of said cylinders, a second set of cylinders axially aligned with but of greater diameter than the operating cylinders being formed in the interior of the valve between the flow passages and operating cylinders, said cylinders being interconnected with first cylinders and interior of valve body, a free floating piston located in each of said second cylinders, each free floating piston having a hub permitting passage of the stem of the operating piston and having seal means about the hub and circumferential wall, the free floating piston and operating piston on each end forming a chamber of variable volume, a passage at each end of the valve for the entry of valve operating fluid on the operating piston at such end, a passage in each of said chambers for flow of operating fluid, fluid delivery means to provide incompressible fluid under pressure, a switching valve, said fluid pressure delivery means connected to said switching valve, conduits from said switching valve to each of the operating pistons so that fluid under pressure can be delivered selectively to either operating piston, an exhaust conduit extending from said valve to the return side of said fluid delivery means, conduits extending from the passages in said chambers, said last mentioned conduits manifolded into one conduit which is connected to the return side of the said fluid delivery means establishing a closed operating system whereby when pressure from said fluid delivery means is switched from one of the operating pistons to the other and the operating piston not being supplied is connected to said exhaust conduit the floating pistons will maintain said chambers in substantial equilibrium with the interior of the valve.

2. In a piston operated valve in which there is a reciprocating gate positioned by opposed fluid motors, said motors controlled by a closed hydraulic system having incompressible fluid and including a pressure generating means and means for interchangeably connecting one of said motors to the outlet side of said pressure generating means and the other of said motors to the suction side of said pressure generating means, the improvement which comprises opposed cylinders axially aligned with but of greater diameter than the opposed fluid motors formed between the interior of the valve and the opposed fluid motors, said cylinders being interconnected with the fluid motors and interior of the valve, a free floating piston located in each cylinder, each free floating piston having a hub permitting passage of part of the fluid motor and having seal means about the circumferential wall, each of said pistons forming with its respective fluid motor a chamber, fluid connecting means establishing communication between said chambers and the suction side of said pressure generating means, whereby when pressure is switched from one fluid motor to the other the floating pistons will maintain said chambers in substantial equilibrium with the interior of the valve.

3. A closed fluid operating system of incompressible fluid for a reciprocating gate valve having floating seal means maintaining pressure differential between the operating system and the interior of the valve at a minimum, said system comprising: a valve housing, a valve member in said housing, opposed fluid motors, one for each end of the valve member, a floating sealed piston interposed between each fluid motor and the valve member isolating the interior of the valve housing from the fluid motors, equalizing chambers formed by the floating pistons and fluid motors, means to provide incompressible fluid under pressure to the operating ends of the fluid motors, means to exhaust fluid from said equalizing chambers for return to the low pressure side of the means providing the incompressible fluid to the system, a switching valve means to direct fluid from said fluid providing means to one or the other of said fluid motors and to return fluid to the low pressure side of the fluid providing means from the motor not being supplied with fluid, the floating pistons varying the size of the equalizing chamber so that the pressure in the equalizing chamber will be in substantial equilibrium with the interior of the valve.

References Cited in the file of this patent

UNITED STATES PATENTS

| | | |
|---|---|---|
| 396,239 | Schreuder | Jan. 15, 1889 |
| 2,478,811 | Downs | Aug. 9, 1949 |
| 2,842,336 | Johnson | July 8, 1958 |